United States Patent
Zhang et al.

(10) Patent No.: US 7,469,404 B2
(45) Date of Patent: Dec. 23, 2008

(54) BANK ASSIGNMENT FOR PARTITIONED REGISTER BANKS

(75) Inventors: Junchao Zhang, Beijing (CN); Dz-ching (Roy) Ju, Saratoga, CA (US); Ruiqi Lian, Beijing (CN); Guei-Yuan Lueh, San Jose, CA (US); Zhaoqing Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 548 days.

(21) Appl. No.: 10/880,117

(22) Filed: Jun. 30, 2004

(65) Prior Publication Data

US 2006/0002224 A1 Jan. 5, 2006

(51) Int. Cl.
*G06F 9/45* (2006.01)
*G11C 8/00* (2006.01)

(52) U.S. Cl. .................................. 717/156; 365/230.03

(58) Field of Classification Search ......... 717/155–156; 365/230.03

See application file for complete search history.

(56) References Cited

U.S. PATENT DOCUMENTS

| | | | | |
|---|---|---|---|---|
| 4,571,678 A * | 2/1986 | Chaitin | ......................... | 717/156 |
| 5,659,754 A * | 8/1997 | Grove et al. | ................. | 717/158 |
| 5,862,385 A * | 1/1999 | Iitsuka | ........................ | 717/156 |
| 5,901,317 A * | 5/1999 | Goebel | ........................ | 717/156 |
| 6,633,576 B1 * | 10/2003 | Melaragni et al. | ............ | 370/412 |
| 6,952,760 B2 * | 10/2005 | Boucher et al. | .............. | 711/170 |
| 7,007,271 B2 * | 2/2006 | Kumar et al. | ................ | 717/151 |
| 7,185,329 B1 * | 2/2007 | Verbitsky | ..................... | 717/156 |
| 2002/0144247 A1 * | 10/2002 | Tirumalai et al. | ............ | 717/155 |
| 2003/0095558 A1 * | 5/2003 | Chung et al. | ................. | 370/417 |

OTHER PUBLICATIONS

Cho et al. "Efficient register and memory assignment for non-orthogonal architectures via graph coloring and MST alogrithms", Jun. 2002, ACM, LCTES/SCOPES '02, pp. 130-138.*
Wang et al. "Power Aware Variable Partitioning and Instruction Scheduling for Multiple Memory Banks", Feb. 2004, IEEE Computer Society, Date '04, vol. 1, pp. 1-6.*
Postiff et al. "The store-load address table and speculative register promotion", Dec. 2000, ACM, pp. 1-10.*
Cheng et al. "Code generation of nested loops for DSP processors with heterogeneous registers and structural pipelinging", Jul. 1999, ACM, TODAES, vol. 4 Ussue 3, pp. 231-256.*
G.J. Chaitin, "Register Allocation & Spilling Via Graph Coloring", In Proc. of the SIGPLAN 82 symposium on Compiler construction, SIGPLAN Notices 17(6), Jun. 1982, pp. 98-105.

(Continued)

*Primary Examiner*—Wei Zhen
*Assistant Examiner*—Anna Deng
(74) *Attorney, Agent, or Firm*—Venable LLP; James R. Burdett (57) ABSTRACT

Operands may be assigned to physical registers within partitioned register banks by identifying possible candidate register banks for an operand. Prior to allocation of the operand to a candidate register bank, conflicts between candidate register banks, if any, may be identified and resolved.

15 Claims, 6 Drawing Sheets

OTHER PUBLICATIONS

Preston Briggs et al., "Coloring Heuristics for Register Allocation", In Proc. of ACM SIGPLAN'89 Conf. on Prog. Language Design and Implementation, pp. 283-294.

Lal George et al., "Taming the IXP Network Processor", In Proc ACM SIGPLAN'03 Conf. on Prog. Language Design and Implementation, 12 pages.

Xiaotong Zhuang et al., "Resolving Register Bank Conflicts for a Network Processor", In Proc. of the 2003 International Conference on Parallel Architecture and Compilation Techniques, pp. 1-10.

Xiaotong Zhuang et al., "Resolving Register Bank Conflicts for a Network Processor," Proc. of the 12th Int'l Conf. on Parallel Architectures and Compilation Techniques, Sep. 27, 2003, pp. 269-278.

A. Sudarsanam et al., "Simultaneous Reference Allocation in Code Generation for Dual Data Memory Bank ASIPs," ACM Trans. on Design Automation of Electronic Systems, vol. 5, No. 2, Apr. 2000, pp. 242-264.

A. Sudarsanam et al., "Memory Bank and Register Allocation in Software Synthesis for ASIPs," Proc. IEEE Int'l Conf. on Computer Aided Design, Nov. 5-9, 1995, pp. 388-392.

\* cited by examiner

| | DEFINITION | USE |
|---|---|---|
| I/O | 1) THE TN MUST RESIDE IN SRAM TRANSFER IN, OR 2) THE TN CAN RESIDE IN EITHER SRAM TRANSFER IN OR DRAM TRANSFER IN. | 1) THE TN MUST RESIDE IN SRAM TRANSFER OUT, OR 2) THE TN MUST RESIDE IN DRAM TRANSFER OUT. |
| ALU | 1) THE TN CAN RESIDE IN GPR A, GPR B, SRAM TRANSFER OUT, OR DRAM TRANSFER OUT. | 1) THE TN CAN RESIDE IN GPR A, GPR B, SRAM TRANSFER IN, OR DRAM TRANSFER IN. |

BANK ASSIGNMENT FOR PARTITIONED REGISTER BANKS

BACKGROUND OF THE INVENTION

In general purpose microprocessors, registers may be separated into register banks (or files), such as an integer register bank and a floating-point register bank. Registers in different banks may differ in size and format, and there may not be a direct data path between register banks. Register allocation (RA) may play an important role in modern optimizing compilers. The task of RA may be to map symbolic registers to physical registers. In general, the register bank of a destination or source operand in an instruction may be determined by the opcode of the instruction. Hence, RA may simply assign symbolic registers to each physical register bank independently.

Domain-specific or embedded processors may have highly partitioned register banks. To allocate to these register banks, compilers may be tasked with choosing a register bank and a physical register in the bank for a symbolic register. However, these processors may have hardware constraints that cause register bank conflicts. Such conflicts may need to be resolved before a compiler chooses a register bank and a physical register in the bank for a symbolic register.

BRIEF DESCRIPTION OF THE DRAWINGS

Various exemplary features and advantages of embodiments of the invention will be apparent from the following, more particular description of exemplary embodiments of the present invention, as illustrated in the accompanying drawings wherein like reference numbers generally indicate identical, functionally similar, and/or structurally similar elements.

DETAILED DESCRIPTION OF EXEMPLARY EMBODIMENTS OF THE PRESENT INVENTION

Exemplary embodiments of the invention are discussed in detail below. While specific exemplary embodiments are discussed, it should be understood that this is done for illustration purposes only. A person skilled in the relevant art will recognize that other components and configurations may be used without parting from the spirit and scope of the invention.

Figure 1:
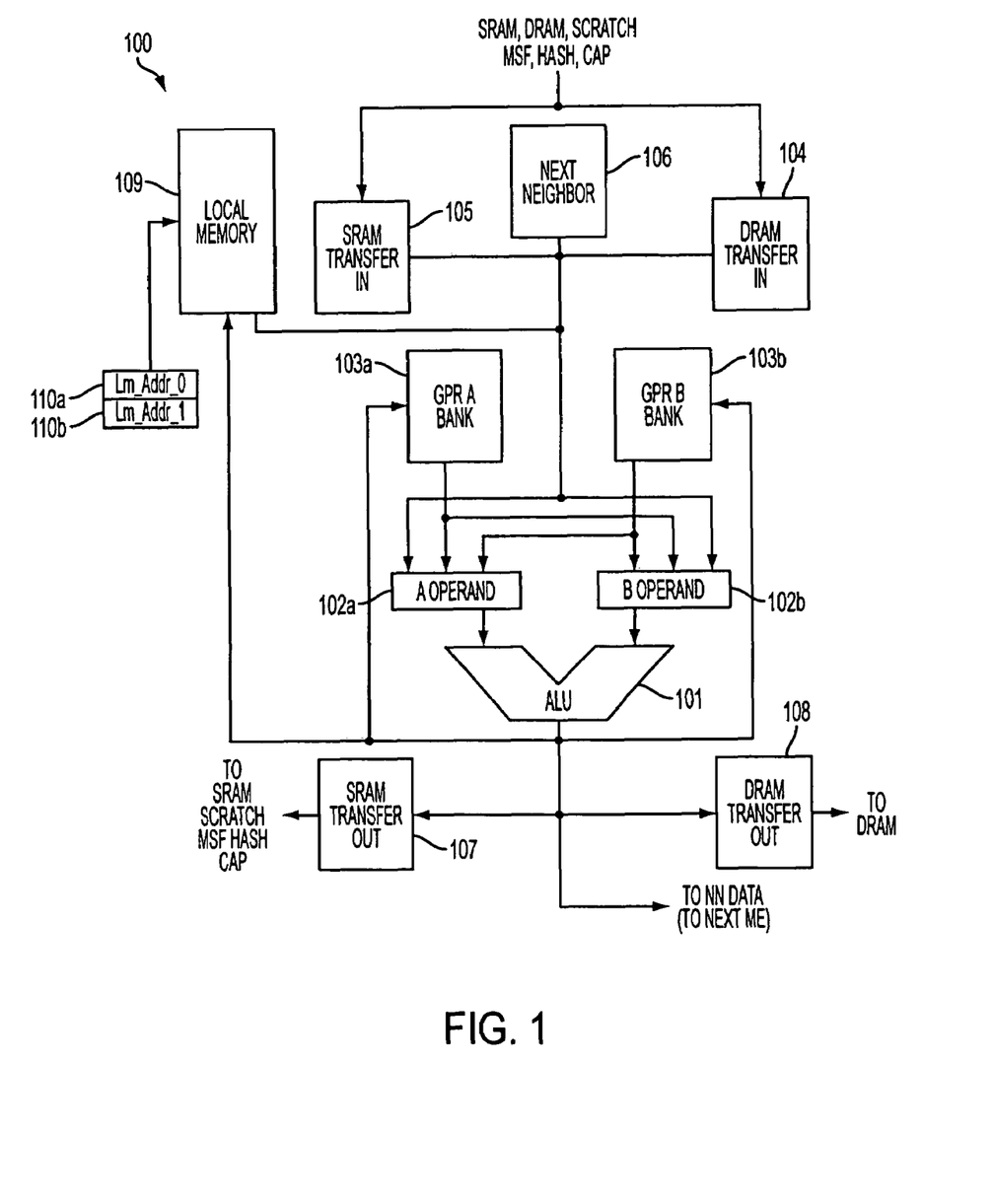
FIG. 1 depicts an exemplary embodiment of a system according to an exemplary embodiment of the invention.

Exemplary embodiments of the present invention may provide a system and method of assigning operands to physical registers within partitioned register banks. FIG. 1 illustrates an exemplary register bank architecture 100 having a multi-bank register architecture. In an exemplary embodiment of the invention, architecture 100 may include an arithmetic logic unit (ALU) 101, operand registers 102a, 102b, general purpose register (GPR) banks 103a, 103b, dynamic random access memory (DRAM) transfer-in register bank 104, static random access memory (SRAM) transfer-in register bank 105, next-neighbor (NN) register bank 106, DRAM transfer-out register bank 107, SRAM transfer-out register bank 108, local memory 109, and local memory addresses 110a, 110b.

In an exemplary embodiment of the invention, a network processor (not shown) may have sixteen connected Microengines (ME). Each ME may be a reduced instruction set computer (RISC) processor and may have eight hardware threads, for example. To reduce register hardware complexity and support hardware multi-threading, each ME may have seven register banks. Such register banks may include GPR A and B banks, SRAM Transfer In and Out banks, DRAM Transfer In and Out banks, and Next Neighbor (NN) bank as shown in FIG. 1.

In an exemplary embodiment of the invention, the register banks may not necessarily be independent. For example, these register banks may be 32 bits wide and capable of representing the same values such that values can be transmitted from one bank to another. One operand of an ME instruction may reside in multiple banks, though with certain constraints.

According to an exemplary instruction set architecture (ISA) specification of MEs, operands of many ME instructions may reside in multiple register banks. For example, a source operand of an ALU instruction may reside in any of the GPR A and B banks, SRAM and DRAM Transfer In banks, and Next Neighbor bank. In such an embodiment, for instruction types that have two source operands, A and B, two source operand selection rules may further restrict the selection of register banks. One such rule may state that the same bank cannot be used for both of the A and B operands. A second such rule may state that SRAM/DRAM Transfer In register banks and the Next Neighbor register bank cannot be used as both of the A and B operands. A third rule may state that immediate values cannot be used as both of the A and B operands.

For example, in an ALU add instruction "r1=r2+r3", r2 and r3 cannot both reside in the GPR A bank or B bank.

In an exemplary embodiment of the invention, it may be possible to move values among different register banks to satisfy these constraints. Hence, the register allocation (RA) for MEs may assign banks and allocate registers properly to meet the constraints above while minimizing the cost incurred by data movement among register banks.

Figure 2:
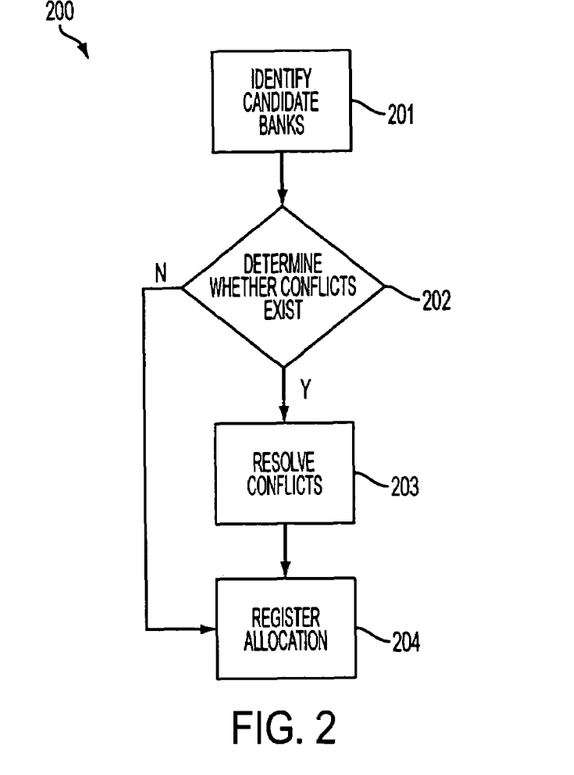
FIG. 2 depicts an exemplary embodiment of a method according to an exemplary embodiment of the invention.

FIG. 2 illustrates a flow chart 200 that illustrates an exemplary method for assigning banks and allocating registers to meet the above constraints and minimize the cost incurred by data movement among register banks. As will be understood by a person having ordinary skill in the art, as referred to herein, a symbolic register (TN) may be a place holder that may be requested each time a code generator or compiler needs a physical register on a target system, for example.

Referring to FIG. 2, in block 201, the candidate banks for each TN may be identified. In an exemplary embodiment of the invention, candidate banks may refer to the banks in which a TN may reside. Due to the different constraints on bank selection at different program points where the TN is referenced, a set of candidate banks for this TN may be empty. In such a case, this TN is said to have bank conflicts. In block 202, it may be determined whether these conflicts exist. If conflicts do not exist, each TN may be allocated to a register in block 204. If conflicts do exist, in block 203, the bank conflicts for each TN may be resolved. After bank conflicts are resolved, each TN may have its own non-empty candidate banks. In an exemplary embodiments of the invention, TNs may then be classified into TN sets, where the TNs in a particular set may have the same candidate banks. In block 204, a traditional intra-set register allocation for each TN set may be performed using, for example, the tasks of coloring and spilling.

These four blocks in FIG. 2 are described in detail below. Note that the Next Neighbor bank in ME is treated independently for its special usage (writes to it actually go to the next ME) without the subtle interactions with the other banks, and hence it is not described in detail below.

As mentioned above, the candidate banks of a TN may be determined by instructions using the TN as an operand. In an exemplary embodiment of the invention, a bit vector may be used to represent a TN's candidate banks, such as 0×01 for GPR A bank, 0×02 for GPR B bank, etc. For all of the instructions before RA, the candidate banks of their source and destination operands (i.e., particular instances of TNs) may be set simply according to opcodes and types of the instructions. As referred to herein, a live range may be a connected web of definitions and uses of a TN. Each live range may be named (or numbered) uniquely and may correspond directly to a TN. To calculate the candidate banks of a live range, the intersection of the candidate banks in all of the occurrences of a TN in this live range may be obtained. The resultant intersection set may represent all possible banks to which the TN in this live range may be assigned.

Figure 3:
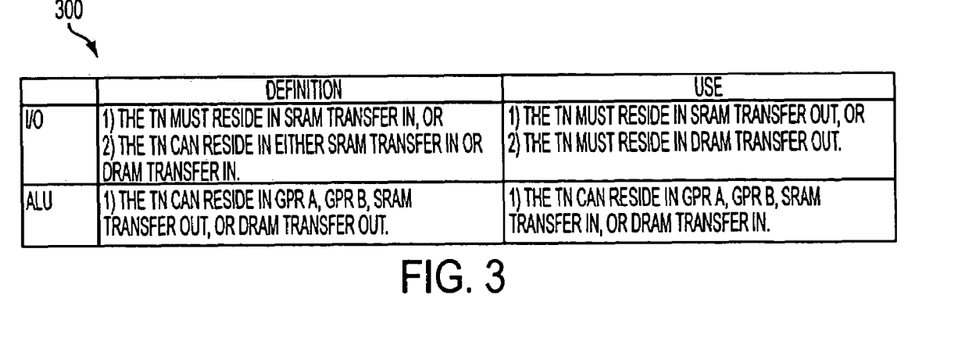
FIG. 3 depicts an exemplary embodiment of a table according to an exemplary embodiment of the invention.

In an exemplary embodiment of the invention, TNs may be defined by input/output (I/O) reads or ALU instructions, and TNs may be used by I/O writes or ALU instructions. FIG. 3 depicts a table 300, which illustrates all possible usages of TNs in a Definition-Use table based on the exemplary system of FIG. 1, as described. For example, as shown in FIG. 3, the bottom-right cell of this table indicates if a TN is used by an ALU operation, then the TN may reside in any bank of GPR A/B, SRAM/DRAM Transfer In. After intersecting the rows and columns of the Definition-Use table, all possible combinations of non-empty candidate banks of a TN may be as follows: the TN must be in SRAM Transfer In; the TN may be in SRAM Transfer In or DRAM Transfer In; the TN must be in SRAM Transfer Out; the TN must be in DRAM Transfer Out; or the TN may be in GPR A or GPR B.

When intersecting the rows and columns of the Definition-Use table, the cases for which the candidate banks of a TN may be empty may be identified. For example, intersecting Cell (I/O, Definition) with Cell (I/O, Use) may produce an empty result. As referred to herein, an empty result may mean that there are no candidate banks available. In general, there may be three different kinds of conflicts that may cause empty results. As referred to herein, a "definitions conflict" may exist when a TN is defined by both I/O reads and ALU operations; a "uses conflict" may exist when a TN is used by both I/O writes and ALU operations; and a "def-use conflict" may exist when a TN is defined by I/O reads and used by I/O writes.

Figure 4:
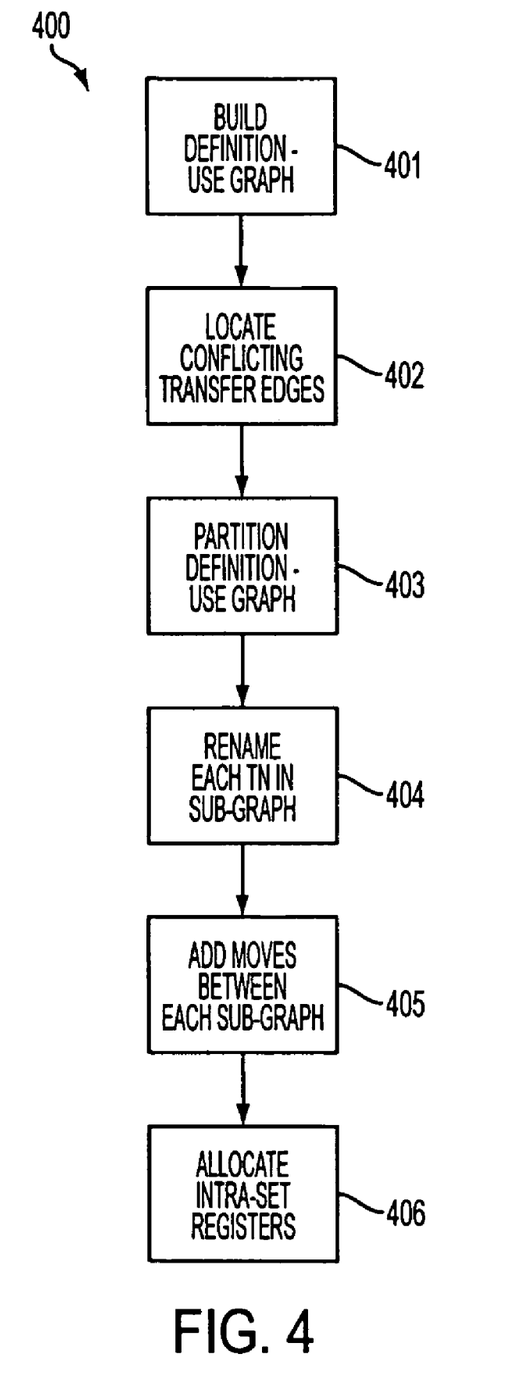
FIG. 4 depicts an exemplary embodiment of a method according to an exemplary embodiment of the invention.
Figure 5:
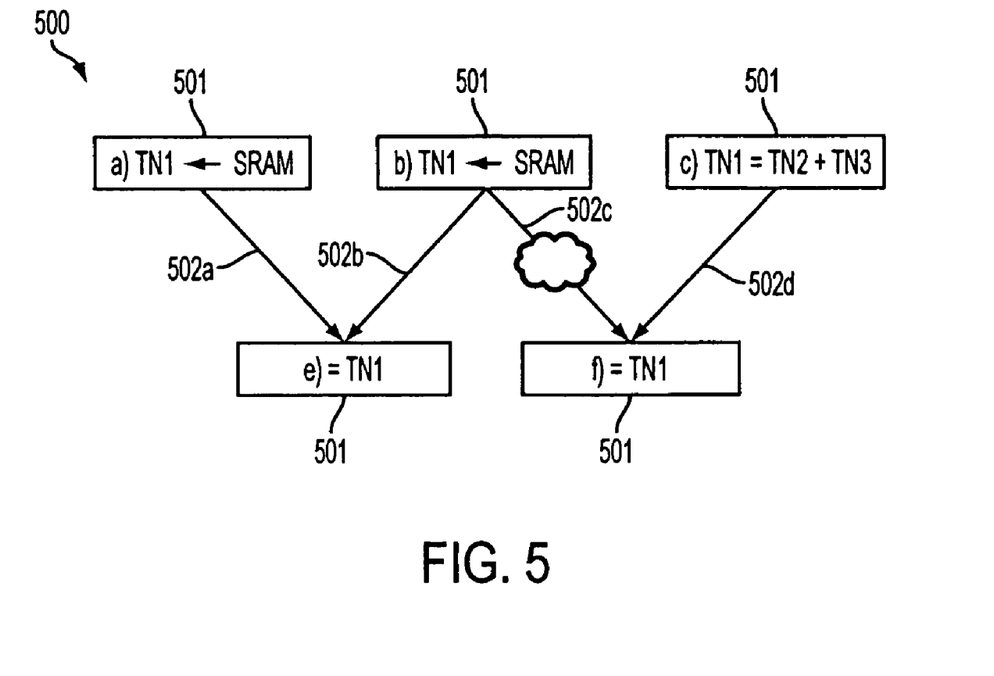
FIG. 5 depicts an exemplary embodiment of a definition-use graph according to an exemplary embodiment of the invention.

In an exemplary embodiment of the invention, to resolve bank conflicts, a conflicting TN (live range) may be split into minimal non-conflicting portions, and then moves may be added to pass values across these non-conflicting portions. FIG. 4 depicts flow chart 400, which illustrates an exemplary method for resolving bank conflicts. In block 401, a definition-use graph (DUG) may be built. FIG. 5 depicts an exemplary DUG 500. As can be seen in FIG. 5, each node 501 may represent an instruction that references the TN. An edge 502a-502d (d→u) may represent that the definition of TN in instruction d is used by instruction u. As will be understood by a person having ordinary skill in the art, there may be cycles in the DUG 500, such as TN1=TN1+1.

In block 402, all conflicting transfer edges in the DUG may be located. Based on the three kinds of conflicts mentioned above, conflicting transfer edges may appear in the DUG. In an exemplary embodiment of the invention, a conflicting transfer edge may be an edge in the DUG whose two ends meet one or more of the following conditions: 1) the tail of a transfer edge is an I/O definition and the head of the same transfer edge is an I/O use; or 2) the tail of a transfer edge is an I/O definition and one of the predecessors of the head of the same transfer edge is an ALU definition; or 3) the head of a transfer edge is an I/O use and one of the successors of the tail of the same transfer edge is an ALU use. By scanning all edges of the DUG in block 402, all conflicting transfer edges may be located.

The example in FIG. 5 shows a def-use graph 500 in which the set of candidate banks for TN1 is empty. In FIG. 5, Instruction "TN1←SRAM" loads a value from SRAM into TN1. Edge (b, f) may be a conflicting transfer edge because it meets the second condition listed above, namely the tail b is an I/O definition and predecessor c of f is an ALU definition.

In block 403, the DUG may be partitioned. In an exemplary embodiment of the invention, to partition the DUG, all conflicting transfer edges may be broken to obtain w sub-graphs: R1, R2, . . . , Rw.

Figure 6:
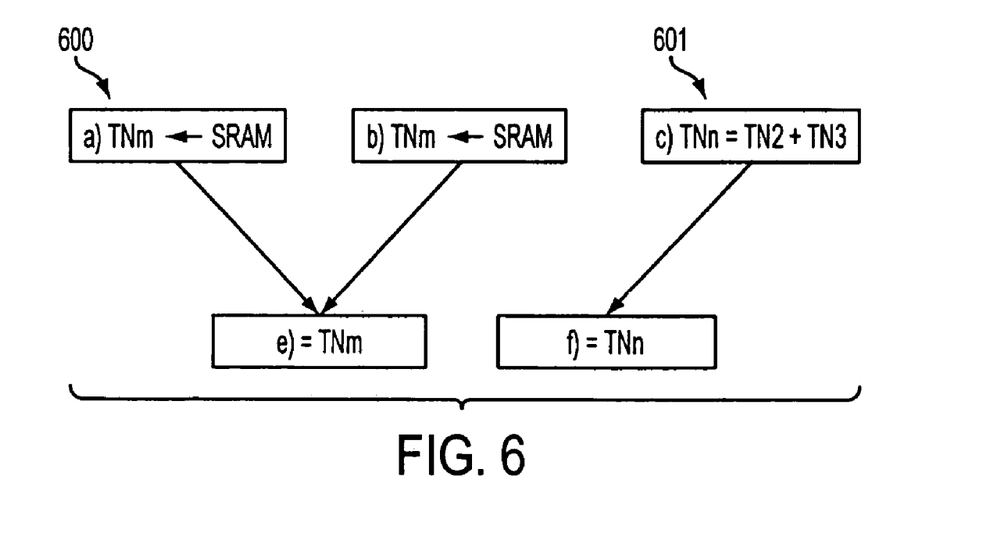
FIG. 6 depicts an exemplary embodiment of definition-use sub-graphs according to an exemplary embodiment of the invention.

Once the sub-graphs have been obtained, the TN in each sub-graph may be renamed in block 404. FIG. 6 depicts sub-graphs 600, 601, which may be created by breaking the conflicting edge (b, f) in FIG. 5. As shown in FIG. 6, TN1 in each of the two sub-graphs may be renamed to TNm and TNn.

In block 405, moves may be added between each sub-graph. In an exemplary embodiment of the invention, to add moves between each sub-graph, for each edge (d, u) which was broken, suppose that the TN in d is renamed to TNm and the TN in u to TNn. Conceptually, as will be understood by a person having ordinary skill in the art, a move "TNn=TNm" may need to be inserted at the def-use edge. In an exemplary embodiment of the invention, move(s) may be inserted in a control flow graph (CFG) to break a live range of TN between instruction d and instruction u. For example, use BB(i) to represent the basic block (BB) containing instruction i. To minimize the dynamic cost of the inserted moves, the min-cut set of the paths from BB(d) to BB(u) weighted by execution frequency may represent the optimal places to put the moves. A critical edge in the CFG may be an edge whose head has multiple predecessors and whose tail has multiple successors. All critical edges in the CFG may be split by placing an empty basic block on each of the edges before RA. The min-cut set may be computed based on a directed acyclic graph (DAG) constructed by removing the cycles in the CFG. Note that this DAG may be composed of all BBs and edges from BB(d) to BB(u) except for the back edges of loops if any. For a single-entry-single-exit DAG, where the entry is BB(d) and the exit is BB(u), the min-cut set may be calculated from the entry to the exit and insert moves in the BBs of the min-cut set.

Figure 7A:
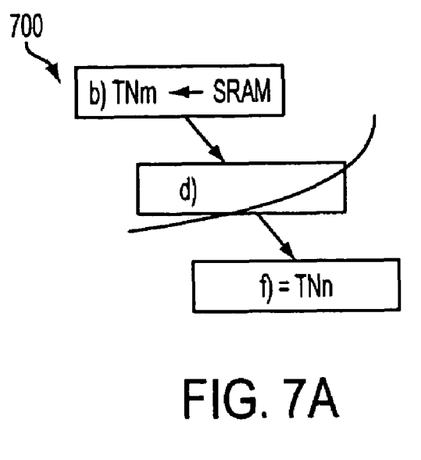
FIG. 7a depicts an exemplary embodiment of a directed acyclic graph according to an exemplary embodiment of the invention.
Figure 7B:
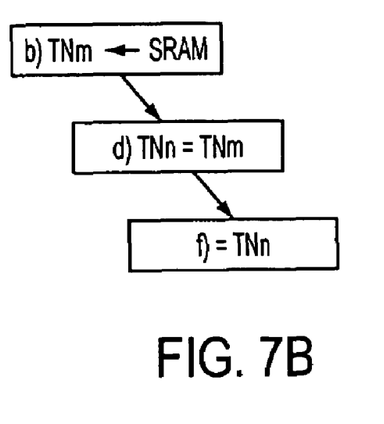
FIG. 7b depicts an exemplary embodiment of a directed acyclic graph according to an exemplary embodiment of the invention.

FIG. 7a depicts an exemplary DAG 700 for the example described above. The min-cut set from b to f may be {d}. A move TNn=TNm may be inserted in basic block d as is shown in FIG. 7b. Once all moves have been inserted, the candidate banks of all TNs (i.e., live ranges) may be identified and non-empty. Each TN is assigned to one of the following exemplary sets: S_Xfer_In_Set={TNs must be in SRAM Transfer In}; SD_Xfer_In_Set={TNs may be in SRAM Transfer In or DRAM Transfer In}; S_Xfer_Out_Set={TNs must be in SRAM Transfer Out}; D_Xfer_Out_Set={TNs must be in DRAM Transfer Out}; and GPR_Set={TNs may be in GRA A or GPR B}

In block 406, intra-set registers may be allocated. In an exemplary embodiment of the invention, graph coloring based register allocation may be used for each of the TN sets above independently. Due to the two source operand selection rules listed above, special treatments may be given to the following cases.

When performing RA for S_Xfer_In_Set and SD_Xfer_In_Set, for example, the rule that SRAM or DRAM Transfer In may not be used as both A and B operands may need to be complied with.

To comply with such a rule, in an exemplary embodiment of the invention, a symbolic register conflict graph (SRCG) may be built for each BB. As will be understood by a person having ordinary skill in the art, an SRCG may resemble a DUG. However, in the SRCG, nodes may be TNs in a Transfer In set. An edge may connect two nodes if both are source operands in the same instructions. All edges in the SRCG may then be broken. To break the edges, the node with the highest degree (i.e. the largest number of neighboring nodes) may be selected and a move instruction may be inserted to move it to a new TN (the candidate banks of these new TNs may then be calculated and put them in the corresponding TN sets). The node's uses may be renamed at the conflicting points using the new TN in this basic block. In an exemplary embodiment of the invention, this may be equivalent to removing the node and associated edges from the SRCG. This process may be continued until all edges are broken. RA may then be applied.

When performing RA for GPR_Set, the rule that two source operands of an instruction cannot reside in either GPR A bank or B bank at the same time may need to be complied with.

In exemplary embodiments of the invention, there may be different approaches to color the registers in the GPR_Set. For example, in one embodiment of the invention, an SRCG having nodes that are TNs in GPR_Set may be built. As will be understood by a person having ordinary skill in the art, in such an embodiment, the RA problem may be equivalent to making the SRCG 2-colorable by partitioning the nodes into two parts: A and B, for example. Each part may then be colored using registers from GPR A bank and GPR B bank, respectively. A necessary and sufficient condition for a graph to be 2-colorable is that the graph does not have any odd-length cycles. Therefore, all odd length cycles in the SRCG may be broken if they exist. This breaking may be done by breaking the edges of odd length cycles through adding moves as described above.

Figure 8:
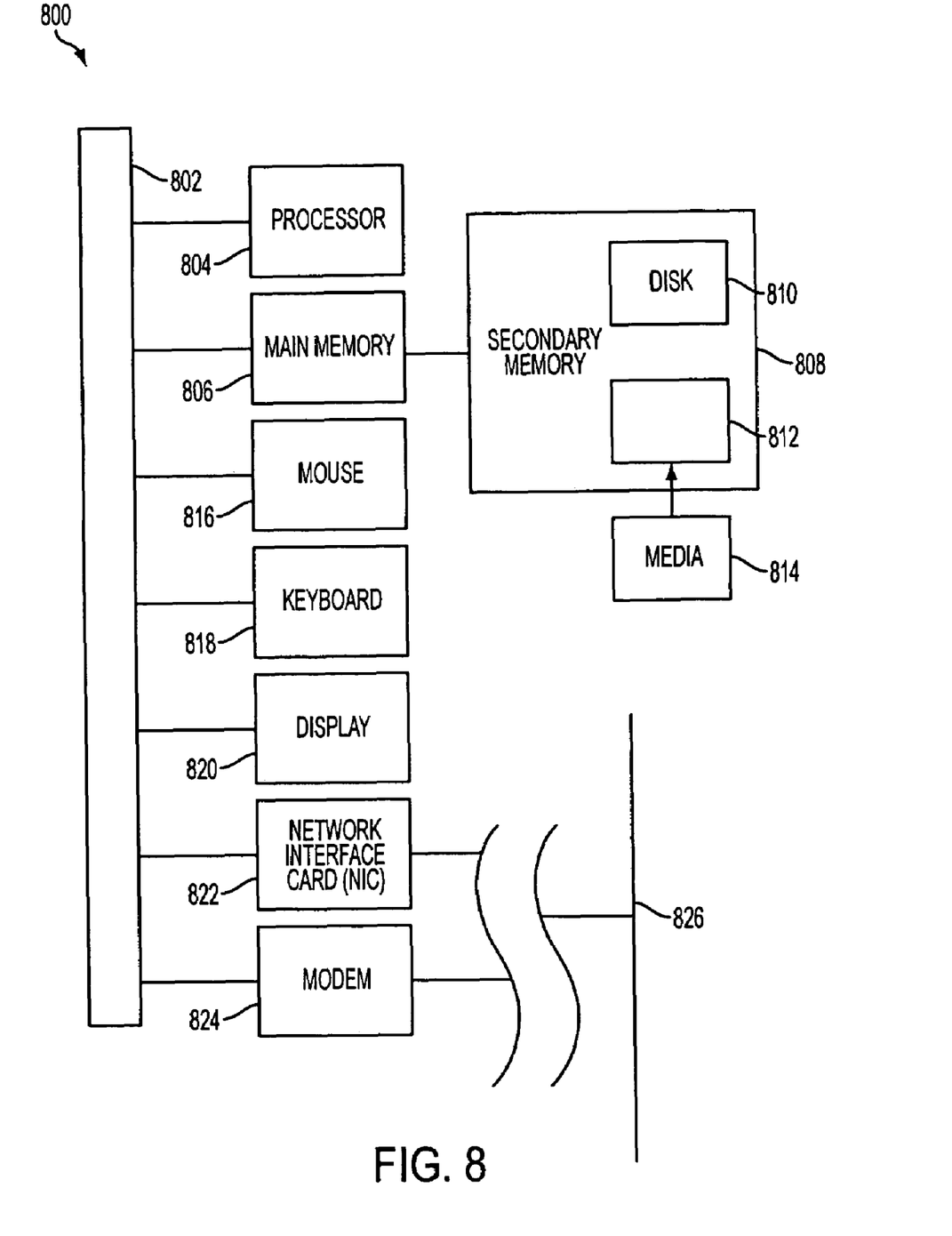
FIG. 8 depicts an exemplary embodiment of a computer and/or communications system as can be used for several components in an exemplary embodiment of the invention.

FIG. 8 depicts an exemplary embodiment of a computer and/or communications system as may be used for several components of the system in an exemplary embodiment of the present invention. FIG. 8 depicts an exemplary embodiment of a computer 800 as may be used for several computing devices in exemplary embodiments of the present invention. Computer 800 may include, but is not limited to: e.g., any computer device, or communications device including, e.g., a personal computer (PC), a workstation, a mobile device, a phone, a handheld PC, a personal digital assistant (PDA), a thin client, a fat client, a network appliance, an Internet browser, a paging, or alert device, a television, an interactive television, a receiver, a tuner, a high definition (HD) television, an HD receiver, a video-on-demand (VOD) system, a server, or other device.

Computer 800, in an exemplary embodiment, may comprise a central processing unit (CPU) or processor 804, which may be coupled to a bus 802. Processor 804 may, e.g., access main memory 806 via bus 802. Computer 800 may be coupled to an Input/Output (I/O) subsystem such as, e.g., a network interface card (NIC) 822, or a modem 824 for access to network 826. Computer 800 may also be coupled to a secondary memory 808 directly via bus 802, or via main memory 806, for example. Secondary memory 808 may include, e.g., a disk storage unit 810 or other storage medium. Exemplary disk storage units 810 may include, but are not limited to, a magnetic storage device such as, e.g., a hard disk, an optical storage device such as, e.g., a write once read many (WORM) drive, or a compact disc (CD), or a magneto optical device. Another type of secondary memory 808 may include a removable disk storage device 812, which may be used in conjunction with a removable storage medium 814, such as, e.g. a CD-ROM, or a floppy diskette. In general, the disk storage unit 810 may store an application program for operating the computer system referred to commonly as an operating system. The disk storage unit 810 may also store documents of a database (not shown). The computer 800 may interact with the I/O subsystems and disk storage unit 810 via bus 802. The bus 802 may also be coupled to a display 820 for output, and input devices such as, but not limited to, a keyboard 818 and a mouse or other pointing/selection device 816.

The embodiments illustrated and discussed in this specification are intended only to teach those skilled in the art various ways known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that the invention may be practiced otherwise than as specifically described.

What is claimed is:

1. A method to allocate an operand into a register bank, the method comprising:
   identifying all candidate banks for the operand from three or more register banks, said identifying comprising:
      identifying all occurrences of the operand,
      classifying each occurrence into one of a plurality of classes, each class having at least one associated register bank,
      comparing classes for intersections of associated sets of register banks, and
      generating an intersection set based on the intersections of associated sets of register banks;
   determining whether a conflict exists between the candidate banks;
   resolving any conflicts; and
   allocating the operand to the register bank, said allocating comprising:
      determining whether a single occurrence of an operand appears as both operands for an instruction,
      determining whether two operands for a single arithmetic logic unit instruction appear in a single general purpose register bank,
      resolving conflicts if a single occurrence of an operand appears both operands for an instruction by using a symbolic register conflict graph, and resolving conflicts if two operands for a single arithmetic logic unit instruction appear in a single general purpose register bank by using graph coloring.

2. The method according to claim 1, said determining comprising:
determining whether the intersection set is an empty set;
proceeding to said resolving if the intersection set is empty; and
proceeding to said allocating if the intersection set is not the empty set.

3. The method according to claim 1, said resolving comprising:
splitting the intersection set into minimal non-conflicting portions; and
adding moves to pass values across the non-conflicting portions.

4. The method according to claim 3, said splitting comprising:
building a definition-use graph for all occurrences of the operand;
identifying all conflicting transfer edges in the definition-use graph based on a set of predetermined conditions; and
partitioning the definition-use graph.

5. The method according to claim 4, the definition-use graph comprising:
a plurality of nodes that references each respective occurrence of the operand; and
definition-use (d→u) edges to represent that the definition d of each respective occurrence is used by an instruction u, wherein the conflicting transfer edges are edges in the definition-use graph whose ends meet, and wherein the predetermined set of conditions establish conflicts if
a tail of one of the conflicting transfer edges is of an input/output definition type and a head of the one of the conflicting transfer edges is of an input/output use type,
the tail of the one of the conflicting transfer edges is of the input/output definition type
and a predecessor of a head of the one of the conflicting transfer edges is an arithmetic logic unit use, or
a head of the one of the conflicting transfer edges is of the input/output use type and a successor of a tail of the one of the conflicting transfer edges is an arithmetic logic unit definition.

6. The method according to claim 3, said adding comprising;
adding moves using a min-cut set algorithm.

7. The method according to claim 1, said allocating comprising:
using graph coloring when no conflicts exist.

8. A system comprising:
a plurality of register banks to store an operand; and
a compiler to perform a method comprising
identifying all candidate banks for the operand from three of more register banks, said identifying comprising:
identifying all occurrences of the operand,
classifying each occurrence into one of a plurality of classes, each
class having at least one associated register bank,
comparing classes for intersections of associated sets of register banks, and
generating an intersection set based on the intersections of associated sets of register banks;
determining whether a conflict exists between the candidate banks;
resolving any conflicts; and
allocating the operand to one of the plurality of register banks, said allocating comprising:
determining whether a single occurrence of an operand appears as both operands for an instruction,
determining whether two operands for a single arithmetic logic unit instruction appear in a single general purpose register bank,
resolving conflicts if a single occurrence of an operand appears as both operands for an instruction by using a symbolic register conflict graph, and
resolving conflicts if two operands for a single arithmetic logic unit instruction appear in a single general purpose register bank by using graph coloring.

9. The system according to claim 8, wherein said register banks include partitioned register banks.

10. The system according to claim 9, wherein partitioned register banks include at least one of first second register banks, memory transfer register banks, or a next neighbor register bank.

11. A machine accessible medium containing program instruction that, when executed by a processor, cause the processor to perform a series of operation comprising:
identifying all candidate register banks for an operand, said identifying comprising:
identifying all occurrences of the operand
classifying each occurrence into one of a plurality of classes, each class having at least one associated register bank,
comparing classes for intersections of associated sets of register banks, and
generating an intersection set based on the intersections of associated sets of register banks;
resolving a conflict between the candidate register banks if a conflict exists; and
allocating the operand to a register bank, said allocating comprising:
determining whether a single occurrence of an operand appears as both operands for an instruction,
determining whether two operands for a single arithmetic logic unit instruction appear in a single general purpose register bank,
resolving conflicts if a single occurrence of an operand appears as both operands for an instruction by using a symbolic register conflict graph, and
resolving conflicts if two operands for a single arithmetic logic unit instruction appear in a single general purpose register bank by using graph coloring.

12. The machine accessible medium according to claim 11, further containing program instructions that, when executed by the processor cause the processor to perform further operations comprising:
determining whether the intersection set is an empty set;
resolving is the intersection set is empty; and
allocating if the intersection set is not empty.

13. The machine accessible medium according to claim 11, further containing program instructions that, when executed by the processor cause the processor to perform further operations comprising:
splitting the intersection set into minimal non-conflicting portions; and
adding moves to pass values across the non-conflicting portions.

14. The machine accessible medium according to claim 13, further containing program instructions that, when execute by the processor cause the processor to perform further operations comprising:

building a definition-use graph for all occurrences of the operand;

identifying all conflicting transfer edges in the definition-use graph based on a set of predetermined conditions; and partitioning the definition-use graph.

15. The machine accessible medium according to claim 13, further containing program instructions that, when executed by the processor cause the processor to perform further operations comprising:

adding moves using a min-cut algorithm.

* * * * *